Patented July 21, 1936

2,047,946

UNITED STATES PATENT OFFICE 2,047,946

PROCESS FOR THE CHLORINATION OF PHTHALIDE AND FURTHER TREATMENT OF THE CHLORINATION PRODUCT

Paul R. Austin and Euclid W. Bousquet, Wilmington, Del., assignors to E. I. du Pont de Nemours & Company, Wilmington, Del., a corporation of Delaware No Drawing. Application September 22, 1934, Serial No. 745,108

13 Claims. (Cl. 260—108)

This invention relates to the preparation of aromatic aldehydic acids, and particularly to the preparation of aromatic aldehydic acids such as phthalaldehydic acid from aromatic lactones such as phthalide.

Phthalide has been chlorinated by various investigators. Racine, Annalen 239 81 (1887), obtained a mixture of products from which he isolated only phthalyl chloride and phthalide. Gabriel, Berichte 49 1608 (1916), chlorinated phthalide at a temperature of 140° C. and using 100% of the theoretical amount of chlorine. Repetition of the procedure outlined by Gabriel demonstrates that only low yields of chlorophthalide are obtained in this process. So far as we are aware no previous disclosure has been made either of the prepartion of phthalaldehydic acid from phthalide through the chlorophthalide or of the hydrolysis of chlorophthalide to form phthalaldehydic acid.

This invention has as an object an improved process for the chlorination of phthalide. A further object is the hydrolysis of this chlorination product to phthalaldehydic acid. A further object of the invention is the combination of these two steps into an efficient process for the preparation of phthalaldehydic acid. A still further object of the invention is the preparation of similar chlorinated aromatic lactones. A still further object is the preparation of aromatic aldehydic acids from these chlorinated lactones. Other objects will appear hereinafter.

These objects are accomplished by the following invention wherein an aromatic lactone such as phthalide or naphthalide is reacted with a rapid stream of chlorine at a temperature above the melting point of the lactone and sufficiently high to insure a rapid absorption of chlorine but below that at which a dichlorinated compound is formed in substantial amounts, and the chlorination product then hydrolyzed by means of hot water.

The method developed for the preparation of phthalaldehydic acid from phthalide consists of a combination of two major steps: (a) the preparation of alpha-chlorophthalide, and (b) the hydrolysis of alpha-chlorophthalide to form phthalaldehydic acid.

The chlorination of phthalide to alpha-chlorophthalide is accomplished by passing dry chlorine into the stirred, hot (130°–140° C.) phthalide rapidly until the gain in weight attains about 75% to 85% of the theoretical amount required for the substitution of one atom of chlorine for one atom of hydrogen. The crude mixture of phthalide and products of its chlorination may be crystallized or distilled to isolate the pure alpha-chlorophthalide, or the crude mixture may be used directly without further treatment in step (b).

The crude alpha-chlorophthalide obtained in step (a) is introduced in portions into an amount of hot water which is approximately three times the weight of the original phthalide. An exothermic reaction ensues wherein the alpha-chlorophthalide is hydrolyzed to phthalaldehydic acid. When the exothermic reaction subsides, the reaction may be completed by a further heating for perhaps 15 to 30 minutes, after which the mixture is thoroughly cooled and the crude phthalaldehydic acid which crystallizes out is filtered and dried.

The crude mixture thus obtained contains phthalaldehydic acid, phthalide, phthalic acid, and other impurities. In order to purify the phthalaldehydic acid from these impurities, it is advantageous to crystallize the material from benzene which does not appreciably dissolve the phthalic acid and which holds the very soluble phthalide in solution. One or more such crystallizations may be necessary to obtain a pure product.

Alpha-chlorophthalide is a colorless solid which melts at 61° C. and distills without decomposition at 152° to 156° C. and 17 mm. It is soluble in most non-polar organic solvents, but is only sparingly soluble in petroleum ether.

Phthalaldehydic acid is a colorless solid which melts at 100° C. It is soluble in most non-polar organic solvents and in alkali carbonate and caustic solutions but is only sparingly soluble in cold water, petroleum ether and benzene. It possesses typical aldehyde characteristics and therefore reacts with hydroxylamine to form an oxime. It possesses typical acid reactions, and therefore forms esters with alcohols. In addition it possesses unusual properties because of its ability to exist in a pseudo-aldehyde form.

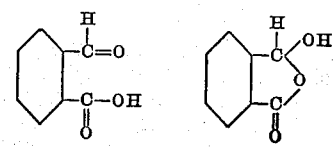

Thus it forms a monoacetate on acetylation with acetic anhydride in the usual manner.

Having outlined the general principles of the invention, the following exemplifications thereof are added for purposes of illustration and not in limitation:

*Example 1*

One-half mol. (67 g.) of phthalide was stirred vigorously and dry chlorine was passed in rapidly at 130° to 140° C. until the gain in weight was 13g. (75% of the theoretical amount). This chlorinated reaction product was hydrolyzed with 300 cc. of boiling water and using the procedure described above a 62% conversion to phthalaldehydic acid was obtained, 24% of phthalide was recovered and no phthalic acid was produced. This is a yield of 81.6% based on the phthalide consumed.

Example 2

Four mols (536 g.) of phthalide was treated as in Example 1 except that 118 g. (85% of the theoretical amount) of chlorine was added. The mixture was decomposed with 1000 cc. of water and 68.5% conversion to phthalaldehydic acid was obtained, 13.5% of phthalide was recovered and in addition 6.5% of phthalic acid was isolated. This is a yield of 79.2% on the phthalide consumed.

Example 3

Twenty mols of phthalide was chlorinated as in the previous example except that the reaction mixture was illuminated with ultraviolet light from a quartz mercury vapor arc. The rate of chlorination was greatly increased in this case but the results are otherwise the same as described in Examples 1 and 2.

Example 4

One mol. of phthalide was treated as in Example 1 until 27 g. of chlorine (78% of the theoretical amount) was added; the product crystallized on cooling. This was recrystallized from benzene-petroleum ether mixture and gave 65 g. (38.5% of the theoretical yield) of pure alpha-chlorophthalide.

Example 5

Fifty grams of pure 5-nitrophthalide was stirred vigorously and dry chlorine was passed in rapidly at 185°–190° C. for two hours, during which time the reaction mixture was illuminated with ultraviolet light from a quartz mercury vapor arc. The chlorinated reaction product was hydrolyzed with 300 cc. of boiling water. The solution was filtered, and on cooling, the nitrophthalaldehydic acid crystalized out. It was further purified by dissolving in sodium carbonate solution, reprecipitating with acid, and crystallizing from water. When pure, 5-nitrophthalaldehydic acid is a pale, yellow solid which melts at 160°–161° C. The yield obtained was 38.5% of theoretical.

The process of the invention is broadly applicable to the preparation of aldehydic acids from lactones of the general formula:

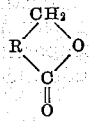

where R is an aromatic group such as benzene or naphthalene which may be further substituted for example by nitro, chloro, bromo, sulfo, carboxyl, methyl, or other alkyl groups, etc. R may thus be a mononuclear or polynuclear, bivalent, ortho or peri aromatic radical. Thus, the process is applicable to the naphthalides of the structures:

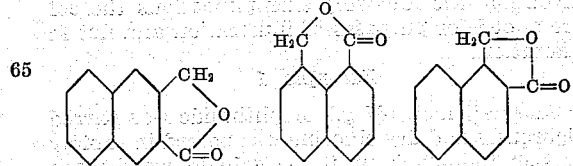

A wide variation in the temperature may be used in the chlorination of phthalide. Thus, the processes may be carried out at any temperature between 80° and 150° C., but it is preferred to carry out the chlorination at a temperature between 130° and 140° C.

For lactones other than phthalide, the chlorination is carried out at a temperature above the melting point of the material to be chlorinated and at a temperature such that the chlorine is rapidly absorbed, but not so high that the dichloro substitution product is formed in substantial amounts. This temperature may readily be ascertained for the individual lactones. Thus, nitrophthalide is satisfactorily chlorinated at about 185°–190° C., i. e., about 35°–40° above its melting point of 150° C.

To reduce the formation of the by-product the chlorination is preferably completed without unnecessary delay. Mechanical stirring is preferably used, altho phthalide may be chlorinated without the use of a mechanical stirrer, the agitation being provided by the passing of the chlorine thru the mixture. The introduction of the chlorine thru a multiplicity of small orifices is effective for rapid absorption of the chlorine.

Vigorous mechanical agitation and a high rate of flow of chlorine is advantageous, since both of these factors tend to increase the rate of reaction and so decrease the amount of by-product formed.

The phthalide may be chlorinated with or without the use of catalysts. Ultraviolet light is particularly effective as a catalyst, since it results in a shortening of the reaction time and a consequent decrease in the tendency of chlorophthalide to react further to form undesirable by-products including phthalyl chloride.

For hydrolysis of the chlorophthalide an amount of water 2.5–3 times the weight of pthalide originally used is preferable, altho this ratio need not necessarily prevail. However, a smaller amount of water is less convenient and a larger amount entails loss of phthalaldehydic acid due to its solubility in water.

In this process the chlorination of phthalide is carried out most advantageously when the amount of chlorine absorbed is substantially less than that equivalent to one chlorine atom per molecule of phthalide. Above 85% chlorination yields begin to decrease because of the conversion of phthalide to phthalic acid. Thus, in chlorinating phthalide to alpha-chlorophthalide in an experiment wherein 85% chlorine was absorbed, approximately 70% phthalaldehydic acid was formed and approximately 5.5% of phthalic acid. In an experiment wherein 96% of chlorine was absorbed, 68% of phthalaldehydic acid was obtained and 15.5% of phthalic acid. This large amount of phthalic acid seriously interfered with the preparation of a pure phthalaldehydic acid. It is surprising to note that if substantially less than the theoretical amount of chlorine required for the formation of monochlorophthalide is added, a greater yield of phthalaldehydic acid is formed (based on phthalide consumed).

The deleterious effect of excessive chlorination is not limited to the production of phthalyl chloride. At preferred operating temperatures, i. e., above 130° C., the phthalyl chloride produced reacts rapidly with phthalide to form alpha-chloro-o-toluyl chloride, phthalic anhydride, and other degradation products. The alpha-chloro-o-toluyl chloride may in turn revert to phthalide. Thus, the production of phthalyl chloride not only entails loss of yields per se, but further complicates the reaction and causes decreased yields. Since these secondary reaction rates increase with temperature the prejudicial effect of over chlorination is magnified when operating at chlorination temperatures which are unnecessarily high.

The economical production of phthalaldehydic acid of high purity makes desirable therefore a limitation of the extent of chlorination to less than the theoretical quantity. It is therefore preferred to work at about 75%–85% of the theory.

The almost instantaneous hydrolysis of chlorophthalide by water is unexpected, in view of the general stability of chloro compounds to hydrolysis.

In the purification of crude phthalaldehydic acid, it is preferred that the material be crystallized from benzene in view of the differential solubility of phthalaldehydic acid and its contaminating impurities in that solvent.

Phthalaldehydic acid and its analogs are particularly useful in the preparation of dyestuffs, and are of interest as intermediates in the synthesis of antioxidants, parasiticides, plasticizers, delusterants, and resins.

The use of a cheap halogen (chlorine) in conjunction with the features and limitations of the reaction above described makes the process of the present invention an economical and commercially feasible means of preparing phthalaldehydic acid for use in these various ways.

The above description and examples are intended to be illustrative only. Any modification of or variation therefrom which conforms to the spirit of the invention is intended to be included within the scope of the claims.

We claim:

1. Process for the preparation of phthalaldehydic acid, which comprises reacting phthalide, illuminated by ultraviolet light, with a rapid flow of chlorine at 130°–140° C. with vigorous agitation until approximately .75 atoms of chlorine per mol of phthalide are absorbed, hydrolyzing the chlorination product with boiling water, cooling, filtering, and recrystallizing the solid from benzene.

2. Process for the preparation of phthalaldehydic acid, which comprises reacting phthalide with a rapid stream of chlorine at 130°–140° C. until approximately .75 atoms of chlorine per mol of phthalide are absorbed, hydrolyzing the chlorination product with boiling water, cooling, filtering, and recrystallizing the solid from benzene.

3. Process for the preparation of phthalaldehydic acid, which comprises reacting phthalide with a rapid stream of chlorine at 100°–150° C. until approximately .75–.85 atoms of chlorine per mol of phthalide are absorbed, hydrolyzing the chlorination product with water and recrystallizing the product from benzene.

4. Process for the preparation of phthalaldehydic acid, which comprises reacting phthalide with a rapid stream of chlorine at a temperature at which chlorine is rapidly absorbed until at least .75 atom but substantially less than 1.0 atom of chlorine per mol of phthalide are absorbed and hydrolyzing the chlorination product with water.

5. Process for the preparation of phthalaldehydic acid, which comprises hydrolyzing, by means of hot water, alpha-monochlorophthalide and recrystallizing the hydrolysis product from benzene.

6. Process for the preparation of phthalaldehydic acid, which comprises hydrolyzing by means of hot water, alpha-monochlorophthalide.

7. Process which comprises reacting phthalide, illuminated by ultraviolet light and at a temperature of 130°–140° C., with a rapid stream of chlorine until .75–.85 atoms of chlorine per mol of phthalide have been absorbed.

8. Process which comprises reacting phthalide at a temperature of 100°–150° C. with a rapid stream of chlorine until at least .75 atoms but substantially less than 1.0 atom of chlorine per mol of phthalide have been absorbed.

9. Process which comprises reacting phthalide at a temperature of 100°–150° C. with a rapid stream of chlorine and stopping the addition of chlorine before substantial amounts of the dichloro derivative are formed.

10. Process for the preparation of phthalaldehydic acid, which comprises reacting phthalide with a rapid stream of chlorine at a temperature sufficiently above the melting point of the phthalide so that chlorine is rapidly absorbed but below a temperature at which substantial amounts of dichlorophthalide are formed, and hydrolyzing the chlorination product thus formed.

11. Process for the preparation of an aromatic aldehydic acid, which comprises reacting an aromatic lactone of the formula:

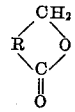

wherein R is a member of the class consisting of ortho and peri residues, of aromatic nuclei with a rapid stream of chlorine at a temperature sufficiently above the melting point of the lactone so that chlorine is rapidly absorbed but below the temperature at which substantial amounts of the dichlorolactone are formed, and hydrolyzing the chlorination product thus formed.

12. Process for the preparation of an aromatic aldehydic acid, which comprises reacting an aromatic lactone of the formula:

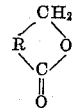

wherein R is a member of the class consisting of ortho and peri residues of aromatic nuclei, with a rapid stream of chlorine at a temperature sufficiently above the melting point of the lactone so that chlorine is rapidly absorbed but below the temperature at which substantial amounts of the dichlorolactone are formed, the chlorine being added until at least 0.75 but substantially less than 1.0 atom of chlorine per mol of the lactone has been absorbed.

13. Process for the preparation of aromatic aldehydic acids, which comprises hydrolyzing by means of hot water the alpha-monochlorination product of an aromatic lactone of the formula:

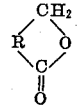

wherein R is a member of the class consisting of ortho and peri residues of aromatic nuclei.

PAUL R. AUSTIN.
EUCLID W. BOUSQUET.